Aug. 28, 1962 T. R. SMITH 3,050,974
COMBINATION WASHER-DRIER HAVING AN AIR FLOW WATER TRAP
Filed Feb. 6, 1961 2 Sheets-Sheet 1
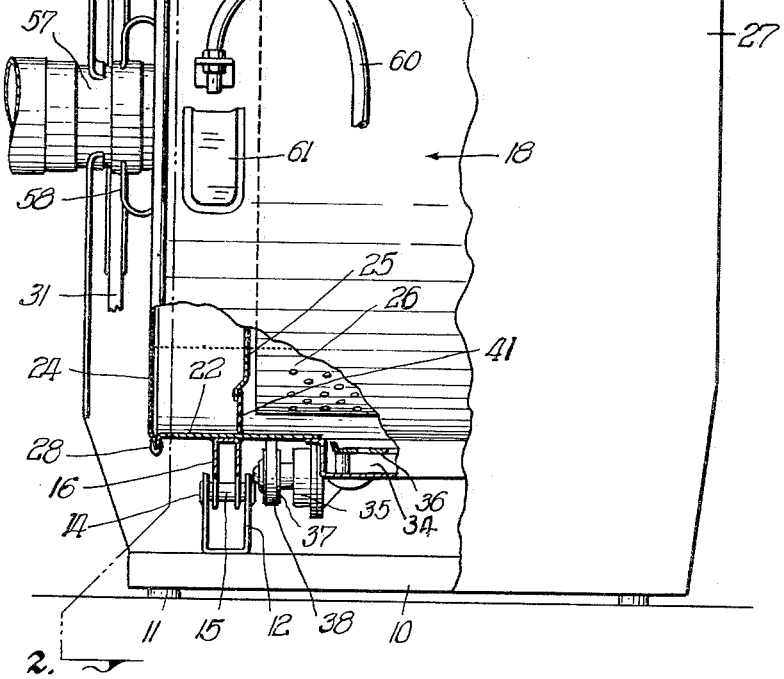
Inventor
Thomas R. Smith
by William G. Landwier
Agent

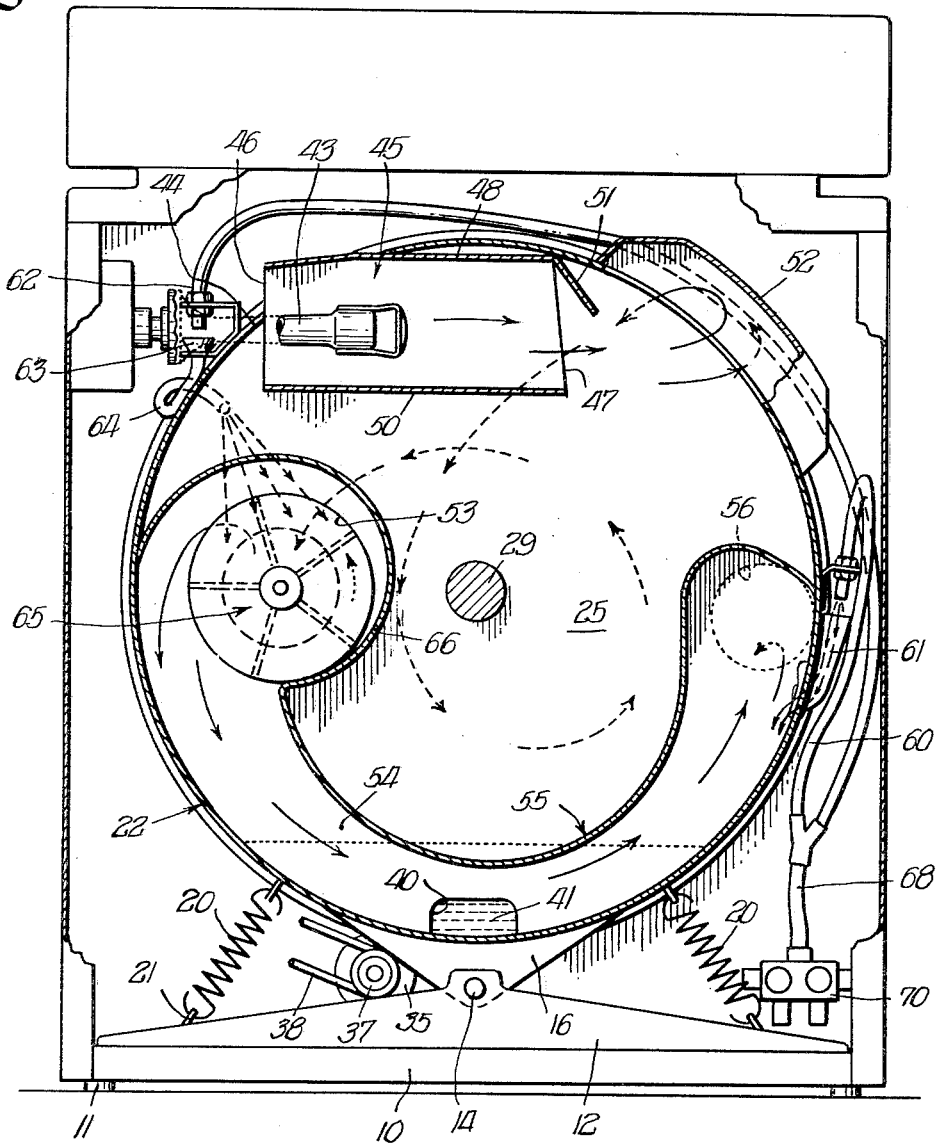

United States Patent Office 3,050,974
Patented Aug. 28, 1962

3,050,974
COMBINATION WASHER-DRIER HAVING AN AIR FLOW WATER TRAP
Thomas R. Smith, Newton, Iowa, assignor to The Maytag Company, Newton, Iowa, a corporation of Delaware
Filed Feb. 6, 1961, Ser. No. 87,235
7 Claims. (Cl. 68—20)

The invention relates to a combination clothes washing and drying unit and has reference in particular to new and novel structure providing an air flow water trap for such a combination washer-drier unit.

A primary object of the invention resides in the provision of certain structural improvements in a washer-drier combination wherein the water levels produced during the washing and rinsing operations are used as a trap on the air circulating fan outlet to prevent air flow during those cycling periods when water is present in the washer tub.

Another object of the invention is to provide improvements in a washer-drier unit wherein the wash and rinse water levels are employed as a trap on the air circulating fan outlet to prevent air flow from taking place within the unit, thereby eliminating solenoids and other types of actuators for either operating a damper or for declutching the fan drive.

Another object of the invention is to provide an air flow water trap for a combination washer-drier unit and which is accomplished in an improved manner by locating the outlet of the air circulating fan somewhat below the normal water level in the tub or casing.

A further object is to provide an air flow water trap having the characteristics as described and which will be especially applicable to the vent type of washer-drier unit wherein it is undesirable to have air discharging from the vent during the washing and rinsing operations.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a side elevational view, the parts being broken away showing the left side of a combination washer-drier unit incorporating the improved features of the invention; and FIGURE 2 is a vertical sectional view taken substantially along line 2—2 of FIGURE 1.

Referring to the accompanying drawings which illustrate an embodiment of the invention, the combination washer-drier unit includes a substantially flat surfaced base member 10, mounted on legs such as 11. Although only one is shown in the drawings, it will be understood that a pair of channel members 12 are welded in spaced relation or otherwise securely fixed to the base 10 to form the two major supports for the tub and rotating clothes drum of the washer-drier unit.

The channel members 12 are substantially triangular in configuration when viewed in elevation as in FIGURE 2. The apex of each member supports a pivot pin 14 and which is journalled by means of the tubular bearing sleeve 15. Accordingly the structure provides a pivotal support for the tub brackets 16, the said brackets being welded or fixed in any suitable manner to the tub or casing generally designated by the numeral 18. The pivoting of the tub on the channel members 12 by means of the pivot pins 14 permits the tub to oscillate back and forth in an arcuate movement in response to various forces generated within the tub.

The tub 18 is maintained in an upright position on the pivot pins 14 by the two centering springs 20 connected between the tub 18 and the base 10 by means of the anchor brackets such as 21 fastened to the respective members. Also, means may be provided in the form of a damper pad and damper leaf spring for absorbing and dissipating the energy imparted to the tub. The damper pad and spring are not disclosed, since they are not concerned with the present invention. However, for a better understanding of the same and for a more complete description of a vent type of washer-drier unit, reference is made to the copending application of Arthur D. Sexton, Serial No. 84,159 filed January 23, 1961, and entitled Gas Fired Combination Washer-Drier.

The tub 18 includes a generally cylindrical side wall 22, a pair of spaced rear walls 24 and 25, and a front wall, not shown, at the front end of the tub, and which includes an opening by means of which the clothes are deposited in the rotating clothes drum 26 of the unit. The tub 18 is enclosed within the substantially rectangular cabinet generally designated by the numeral 27, the front wall of which is likewise provided with an opening in alignment with the opening in the tub and which is provided with the conventional door having a glass window. The rear wall 24 and the front wall are, respectively, connected to the cylindrical side wall 22 by means of an encompassing flanged loop-like member 28. The intermediate rear wall 25 is suitably welded to the cylindrical side wall 22, and although not shown, it will be understood that the spaced walls 24 and 25 support the tub bearing assembly including a spacer hub located between and fixed to the walls 24 and 25. The spacer hub journals a drive shaft 29, FIGURE 2, which extends rearwardly of the outer rear wall 24 and forwardly beyond the intermediate wall 25. The rear extending portion of the drive shaft 29 has the drive pulley 30 fixed thereto. The endless belt 31 passes around the pulley and by means of an electric motor or other form of power, the pulley 30 and its drive shaft 29 are rotated. The forwardly extending end of said drive shaft has the perforated clothes drum 26 suitably fixed thereto, and accordingly the drum is adapted to rotate within the tumbler chamber of the tub. In the illustrated embodiment transmission mechanism of the solenoid operated type is provided and which when energized produces rotation of the drum at a speed of approximately 300 revolutions per minute and when de-energized the clothes drum is caused to revolve at a speed of approximately 50 revolutions per minute.

The tub 18 is formed to provide a lower recessed portion 34 which forms a sump for the tub, the sump 34 communicates with the drain pump 35, and the sump also includes a perforated tray 36 for preventing foreign particles, passing through the perforated clothes drum 26 and into the tub 18, from entering and damaging the pump 35. The drain pump is driven by the electric motor which rotates the clothes drum 26, and for this purpose the pulley 37 and endless belt 38 are provided. It will be observed that the sump 34, which receives the washing and condensing fluids discharged into the tub 18, is positioned between intermediate wall 25 and the outer wall of the tub. Because of this structural feature, a drain aperture 40, FIGURE 2, is provided in wall 25 to enable the liquids and the lint, scrubbed from the air entering the blower and condensing unit, to pass into the sump 34 for eventual discharge to an external drain. However, a check valve such as 41 may be associated with the said aperture 40. In FIGURE 1 the valve is shown closed. Its opening movement is in a direction towards the tumbler chamber of the tub within which is located the perforated clothes drum 26. Said valve functions to eliminate the overflow of suds out of the exhaust opening and to also eliminate the blowing out of foam and suds at the time the machine is being emptied of water and with the blower still operating. The valve is fully described and claimed in the copending application of Smith and Decatur, Serial No. 87,889, filed February 8, 1961, and entitled "Exhaust Vent Suds Control."

It is also necessary to provide a valve, not shown, for the drain pump 35 in order to retain the washing liquid within the tub during the washing operations of the combination unit.

Mounted on the back wall 42 of the cabinet 27 is a gas burner assembly having a part 43 projecting through an opening 44 in the cylindrical wall 22, the said burner extending through said opening and into the combustion chamber 45. The said chamber has the general configuration of a rectangular box with open ends 46 and 47, and top and bottom walls 48 and 50. The open flame of the gas fire from burner 43 is contained within the confines of the chamber 45, and thus said chamber prevents the flame from directly contacting any of the walls of the tub. Also, a baffle 51 is provided at the open end 47 to deflect the flame from the tub wall in the event it should traverse the length of the chamber. A conduit 52 mounted on the tub 18 conducts the heated air from the combustion chamber 45 to the rotatable clothes drum 26.

The path of air flow in the combination washer-drier unit as herein disclosed is from the atmosphere through opening 44 in the tub wall 22, through the combustion chamber 45, past the gas burner part 43, through the conduit 52 and into the perforated clothes drum 26. After traversing the clothes within the drum 26, the air is removed through an opening 53 in the intermediate wall 25, and said air is then forced through the outlet passage 54 formed by the duct work 55. From the said outlet passage the air is discharged through the exhaust conduit 56 in the rear wall 24.

As best shown in FIGURE 1, the exhaust conduit 56 is provided with telescoping pipe structure 57 incorporating resilient means 58 for sealing the joint between the back wall 42 of the cabinet and the rear wall 24 of the tub. The resilient sealing means allows for such limited oscillating movement of the tub as may take place with respect to the stationary back wall of the cabinet during operation of the unit.

Water for the washing operation is supplied by the flexible hose or conduit 60 which discharges into the cup 61 provided on the cylindrical wall 22 of the tub. The wash water thus drains into the tumbler chamber of the tub within which is located the perforated clothes drum 26. A second flexible hose or conduit 62 supplies water for the condensing operation. The said flexible hose 62 discharges into the cup 63 and a length of hose 64 conducts the water from the cup and delivers the same to the impeller 65. A housing for the impeller is produced by cooperation of the rear walls 24 and 25 of the tub with an imperforate scroll shaped side wall 66 as clearly shown in FIGURE 2. The impeller housing suitably connects with the duct work 55 in a manner to provide a passage from the impeller 65 to the exhaust 56. The scroll shaped housing 66 and the duct work 55 bridges the space between the rear walls 24 and 25, and the hose 64 discharges the water against the rotating impeller blades so as to break up the water stream in order to produce a cooling spray and mist for condensing out the hot moist vapors which are generated during the drying operation.

In operation during the washing process, water is fed into the tub to the desired level by means of the hose 60 and cup 61. The said hose 60 connects with the main water supply hose 68 and which has connection with a control valve 70 of the solenoid actuated type. The fluid level within the tub is suitably controlled by means of conventional pressure diaphragm switch mechanism, not shown, and which is suitably connected to a fill valve solenoid in the usual manner.

It will be understood that the impeller 65 rotates continuously during the washing, rinsing and drying cycles, since the impeller is driven by the same motor that produces rotation of the clothes drum 26. Accordingly, during the drying cycle the impeller performs its function of circulating air through the unit in a highly satisfactory manner. Air from the outside is drawn in through the tub opening 44 and heated in the chamber 45. This heated air is then circulated through the tumbler chamber, being drawn into the clothes drum 26 through the perforations therein for drying the clothes. The air is then withdrawn by the impeller 65 and forced to flow in the outlet passage 54 for eventual discharge through the exhaust conduit 56.

Circulation of air in this manner is undesirable during the washing and rinsing cycles, since suds, soapy water and the like such as may entrain with the air will be blown out through the exhaust opening.

A simple drier does not present any such problem in respect to air circulation. However, in combination units of the vent type, the problem has been a serious one of long standing, as evidenced by the many different attempts to solve the same. Thus, declutching means have been provided to stop rotation of the impeller during the washing and rinsing cycles. Also, dampers have been used to close the exhaust opening except during the drying cycle. Such structures are not entirely satisfactory in operation, and further they add to the manufacturing costs of the machine. Also, they require operating parts that must be serviced regularly for their best performance.

Air circulation in a vent type of washer-drier unit is effectively and satisfactorily solved by the present invention. The duct work 55 providing the exhaust passage 54 is so constructed and arranged that a portion of the passage passes through the pool of washing liquid retained by the tub during the washing and rinsing cycles. During these operations the water level within the tub is above the lowest portion of the passage and since said portion is thus submerged a water trap is provided preventing air flow in the passage.

The outlet passage 54 extends from the impeller 65 on one side to the exhaust 56 on the opposite side of the drive shaft 29. Accordingly, the passage is approximately semi-circular in configuration, with the outer wall of the passage being formed by the cylindrical wall 22 of the tub. The inside wall 55 is likewise circular conforming substantially to the curvature of wall 22. The duct work is completed by the walls 24 and 25 which close the passage on respective sides. An important feature of this structure is the fact that the low point of the passage is between the impeller and the exhaust.

During the washing cycle when the water level within the tub is a maximum, the water provides a trap completely closing the passage and thus it is not possible for suds or soapy water to be exhausted from conduit 56 during such a washing operation. Also, during a rinsing operation when the water level may dip to a lower level as shown in dotted lines in FIGURE 2, the water trap is still effective to close off the air passage.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a machine for washing and drying fabrics during washing and drying operations, a tub including walls defining a chamber for retaining a pool of washing fluid during said washing operation, a rotatable drum positioned within said chamber for receiving and tumbling said fabrics during the washing and drying operations, air circulating means operatively associated with said chamber and communicating therewith so as to withdraw air from the chamber, an exhaust conduit also communicating with the chamber through said circulating means for venting air to the atmosphere, said exhaust conduit being in spaced relationship with said air circulating means, and an air flow passage connecting the air circulating means with the exhaust conduit, said air flow passage having a low portion of the same passing through a pool of washing fluid and being submerged by the fluid, whereby a fluid trap is provided preventing air flow from taking place in said passage when the level of the fluid is above the said portion of the passage.

2. In a machine for washing and drying fabrics during washing and drying operations, a tub including walls defining a chamber for retaining a pool of washing fluid during said washing operation, a rotatable drum positioned within said chamber for receiving and tumbling said fabrics during said washing and drying operations, an impeller providing air circulating means operatively associated with said chamber and communicating therewith so as to withdraw air from the chamber, an exhaust conduit also communicating through said circulating means with the chamber for venting air to the atmosphere, said exhaust conduit being in spaced relationship with said impeller, and an air flow passage connecting the air circulating means with the exhaust conduit, said air flow passage having a configuration approximately semi-circular and a low portion of the passage within a pool of washing fluid, said portion being submerged by the fluid when the level thereof is above said portion of the passage, whereby a fluid trap is provided preventing air flow from taking place in said passage.

3. In a machine for washing and drying fabrics during washing and drying operations, a generally cylindrical tub including a cylindrical shell, a front wall and spaced inner and outer rear walls, whereby to define a chamber for retaining a pool of washing fluid during said washing operation, a rotatable drum positioned between the front and inner rear wall for receiving and tumbling said fabrics during the washing and drying operations, an impeller located between the spaced rear walls and communicating with the space containing the rotatable perforate drum through an opening in the inner rear wall, an exhaust conduit also communicating with the said space through said opening, said exhaust conduit being spaced from the impeller and said opening, a scroll shaped housing for the impeller, and an air flow passage between the spaced rear walls and connecting the housing with the exhaust conduit, said air flow passage having a configuration approximately semi-circular and a low portion of the passage within said pool of washing fluid, said low portion being submerged by the fluid when the level thereof is above said portion of the passage, whereby a fluid trap is provided preventing air flow from taking place in said passage.

4. In a machine for washing and drying fabrics during washing and drying operations, a generally cylindrical tub including a cylindrical shell, a front wall and spaced inner and outer rear walls, whereby to define a chamber for retaining a pool of washing fluid during said washing operation, a rotatable drum positioned between the front and inner rear wall for receiving and tumbling said fabrics during the washing and drying operations, an impeller located between the spaced rear walls and communicating with the space containing the rotatable perforate drum through an opening in the inner rear wall, an exhaust conduit through the outer rear wall also communicating with the said space through said opening, said exhaust conduit being in spaced relationship with said impeller, a scroll shaped housing for the impeller, and an air flow passage between the spaced rear walls and connecting the housing with the exhaust conduit, said air flow passage having a configuration approximately semi-circular and being formed by duct work including the cylindrical shell and the spaced inner and outer rear walls, said air flow passage having a low portion thereof passing through the pool of washing fluid, and whereby when said portion of the air flow passage is thus submerged a water trap is formed preventing flow of the air in said passage.

5. In a combination clothes washer and drier, a generally cylindrical tub including a cylindrical shell, an intermediate rear wall, a front wall spaced therefrom to form a tumbler chamber and a rear wall spaced from the intermediate wall, a clothes drum within the tumbler chamber and adapted to rotate on an approximately horizontal axis, an air circulating fan located between the rear walls and operatively associated with an opening in the intermediate rear wall, an exhaust conduit in the rear wall, said exhaust conduit and said fan opening being located on respective sides of the axis of rotation of the clothes drum, a scroll shaped housing for the fan and which bridges the space between the rear walls, duct work including the cylindrical shell and the rear walls and extending from the housing to the exhaust conduit, said duct work providing an air flow passage for conducting air from the fan to the exhaust conduit, said air flow passage having a generally semi-circular configuration and which locates the lowest portion of the passage in alignment with the lowest portion of the tumbler chamber.

6. A combination clothes washer and drier as defined by claim 5, wherein said duct work also bridges the space between the rear walls and wherein the outer walls of the duct work are formed by the said cylindrical shell of the tub.

7. In laundry apparatus, the combination including a tub casing providing a washing and drying chamber, a clothes receptacle revolubly mounted within said chamber on a non-vertical axis, water supply means for delivering water to said tub casing to a predetermined level as required for a washing operation, valved drain means for the tub casing for draining the water from the casing preliminary to a drying operation, air circulating means communicating with the chamber through an opening in said tub casing and adapted to rotate during the washing and drying operations, an exhaust conduit communicating with said chamber through said air circulating means, and duct work located exteriorly of the chamber and connecting the air circulating means with the exhaust conduit whereby an air flow passage is provided, said duct work being so constructed and arranged that a portion of the passage is located below the normal water level in the tub casing, whereby during those operations when said portion of the passage is submerged a water trap is provided preventing air flow from taking place in the passage.

References Cited in the file of this patent
UNITED STATES PATENTS

| 2,758,461 | Tann | Aug. 14, 1956 |
| 2,892,335 | Gray | June 30, 1959 |